US010947443B2

(12) United States Patent
Mota et al.

(10) Patent No.: US 10,947,443 B2
(45) Date of Patent: Mar. 16, 2021

(54) VISCOELASTIC SURFACTANT GEL FOR PERFORATION OPERATIONS (71) Applicant: Halliburton Energy Services, Inc., Houston, TX (US)

(72) Inventors: Jose Luis Carvalho Mota, Spring, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/482,568

(22) PCT Filed: Dec. 20, 2017

(86) PCT No.: PCT/US2017/068159
§ 371 (c)(1),
(2) Date: Jul. 31, 2019

(87) PCT Pub. No.: WO2018/160260
PCT Pub. Date: Sep. 7, 2018

(65) Prior Publication Data
US 2020/0354621 A1 Nov. 12, 2020

Related U.S. Application Data (60) Provisional application No. 62/466,828, filed on Mar. 3, 2017.

(51) Int. Cl.
E21B 43/119 (2006.01)
C09K 8/506 (2006.01)
(52) U.S. Cl.
CPC .......... C09K 8/506 (2013.01); E21B 43/1195 (2013.01); C09K 2208/30 (2013.01)

(58) Field of Classification Search
None
See application file for complete search history.

(56) References Cited

U.S. PATENT DOCUMENTS 7,207,388 B2   4/2007  Samuel et al.
7,727,935 B2   6/2010  Welton et al.
(Continued)

FOREIGN PATENT DOCUMENTS

WO        2011056410        5/2011

OTHER PUBLICATIONS

ISRWO International Search Report and Written Opinion for PCT/US2017/068159 dated Apr. 17, 2018.
Samuel, M., Marcinew, R., Al-Harbi, M., Samuel, E., Xiao, Z., Ezzat, A. M., . . . Nasr-El-Din, H. A. (2003). A New Solids-Free Non-Damaging High Temperature Lost-Circulation Pill: Development and First Field Applications. Middle East Oil Show, SPE81494.
(Continued)

Primary Examiner — Andrew Sue-Ako
(74) Attorney, Agent, or Firm — Tenley Krueger; C. Tumey Law Group PLLC (57) ABSTRACT Provided are compositions, methods, and systems that relate to use of viscoelastic surfactant gels in well perforation. A method for well treatment comprising: introducing a viscoelastic surfactant gel into a wellbore; and forming one or more perforation channels in an interval of the wellbore while the viscoelastic surfactant gel is disposed in the wellbore. A method for well treatment comprising: introducing a viscoelastic surfactant gel into a wellbore over an interval of the wellbore to be perforated; disposing a perforating gun into the wellbore such that the viscoelastic surfactant gel is disposed between the perforating gun and a casing of the wellbore; and forming one or more perforation channels in the interval of the wellbore. A downhole perforating system comprising: a perforating gun disposed at a distal end of a work string; and a viscoelastic surfactant gel.

17 Claims, 3 Drawing Sheets

(56) References Cited

U.S. PATENT DOCUMENTS

| | | |
|---|---|---|
| 8,544,565 B2 | 10/2013 | Huang et al. |
| 9,315,712 B2 | 4/2016 | Van Zanten et al. |
| 2003/0236174 A1 | 12/2003 | Fu et al. |
| 2008/0078548 A1* | 4/2008 | Pauls .................. C09K 8/68 |
| | | 166/280.1 |
| 2008/0161210 A1 | 7/2008 | Welton et al. |
| 2009/0139766 A1 | 6/2009 | Samuel et al. |
| 2009/0143256 A1* | 6/2009 | Welton .................. C09K 8/506 |
| | | 507/218 |
| 2010/0132946 A1* | 6/2010 | Bell .................. E21B 43/126 |
| | | 166/298 |
| 2011/0092398 A1 | 4/2011 | Dahanayake et al. |
| 2013/0090270 A1* | 4/2013 | Crews .................. C09K 8/68 |
| | | 507/240 |
| 2016/0017210 A1 | 1/2016 | Li et al. |
| 2016/0160109 A1 | 6/2016 | Patil et al. |
| 2016/0341017 A1 | 11/2016 | Fu et al. |
| 2016/0356107 A1 | 12/2016 | Sarmah et al. |

OTHER PUBLICATIONS

Van Zanten, R., & Ezzat, A. M. (2011). Advanced Viscoelastic Surfactant Gels for High-Density Completion Brines. SPE European Formation Damage Conference, SPE143844.

Nasr-El-Din, H. A., Gurluk, M. R., & Crews, J. B. (2013). Enhancing the Performance of Viscoelastic Surfactant Fluids Using Nanoparticles. EAGE Annual Conference & Exhibition Incorporating SPE Europec. SPE164900.

Huang, T., Clark, D. E., & Crews, J. B. (2011). Protecting the Reservoir With Surfactant Micellar Drill-In Fluids in Carbonate-Containing Formations. SPE Drilling & Completion, 26(04), 492-498. SPE135166-PA1.

Lingling Li, Viscoelastic Surfactants, AkzoNobel.

Lingling Li, A HTHP Viscoelastic Surfactant in Completion Applications, AkzoNobel.

Material Safety Data Sheet, AkzoNobel, Apr. 30, 2013.

Safety Data Sheet, AkzoNobel, May 14, 2015.

\* cited by examiner

VISCOELASTIC SURFACTANT GEL FOR PERFORATION OPERATIONS

BACKGROUND

In completing a well, it is usually necessary to perforate the earth formations penetrated by a well bore as a means for inducing the passage of formation fluids into the well bore. In cased wells, it may also necessary to perforate the steel casing which lines the well bore and the cement annulus in which the casing is set. To further stimulate and induce the flow of fluids from the formations, hydraulic fracturing or acidizing techniques may be utilized in conjunction with perforating.

In perforation operations, a fluid commonly referred to as a "perforating fluid" may be placed in the wellbore over the interval to be perforated. To minimize formation damage from leakoff of the perforating fluid after perforation, perforating fluids are commonly clean and solids free (or nearly solids free as possible). The perforating fluid (or the base fluid thereof) may be filtered to a high degree to provide a perforating fluid that is at least substantially solids free.

BRIEF DESCRIPTION OF THE DRAWINGS

These drawings illustrate certain aspects of some examples of the present disclosure, and should not be used to limit or define the disclosure.

DETAILED DESCRIPTION

Provided are compositions and methods for well treatment. More particularly, the present disclosure relates to compositions and methods for using viscoelastic surfactant (VES) gels in well perforation. The VES gel may be used in any suitable manner during well perforation, including, but not limited to, as a perforating fluid that is placed over the interval to be perforated or as fluid loss control pill placed in the wellbore above the perforating fluid. Advantageously, the VES gel may be particularly suited for use in perforating as it may be solids and polymer free while retaining fluid loss control properties to limit damage to perforation tunnels. In particular, the self-healing nature of the VES gel may be particularly suited for perforation operations that would ordinarily destroy conventional gelled fluids, such as those formed using polysaccharides (e.g., xanthan or guar gums). The VES gel may form a self-breaking block in the perforation tunnels. As the VES fluid has the capability of breaking when contacted by reservoir fluids (e.g., oil), workover or cleanup operations may be reduced and potentially eliminated.

The VES gel may include an aqueous liquid and a viscoelastic surfactant. VES gels normally are made by mixing appropriate amounts of one or more viscoelastic surfactants, such as anionic, cationic, nonionic and zwitterionic surfactants, with an aqueous liquid. The viscosity of VES gels may be attributed to the physical associations of the one or more viscoelastic surfactants, including the three dimensional structure that may be formed by the one or viscoelastic surfactants when these components when mixed. When the concentration of the one or more viscoelastic surfactants in a viscoelastic fluid exceeds a critical concentration, and in most cases in the presence of an electrolyte, surfactant molecules aggregate into species such as micelles, which can interact to form a network exhibiting elastic behavior. As used herein, the term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. These micelles may function, among other purposes, to stabilize emulsions, break emulsions, stabilize a foam, change the wettability of a surface, solubilize certain materials, and/or reduce surface tension. When used as a gelling agent, the surfactant molecules (or ions) associate to form micelles of a certain micellar structure (e.g., rod like, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel.

Certain viscosifying micelles may impart increased viscosity to a fluid such that the fluid exhibits viscoelastic behavior (e.g., shear thinning properties) due, at least in part, to the association of the surfactant molecules contained therein. Viscoelasticity is the property of a material that exhibits both viscous and elastic characteristics when undergoing deformation. Viscous materials resist shear flow and strain linearly with time when a stress is applied to the material. Elastic materials strain instantaneously when a stress is applied and quickly return to the original state once the stress is removed. A material is considered viscoelastic where the relationship between stress and strain depends on time. Measuring the viscoelasticity of a fluid can help determine the suspending capabilities of the fluid. As used herein, the term "VES gel" refers to a fluid that exhibits or is capable of exhibiting viscoelastic behavior due, at least in part, to the association of surfactant molecules contained therein to form viscosifying micelles. As used herein the term "viscoelastic surfactant" refers to a surfactant capable of impart viscoelastic behavior to the aqueous liquid, at least in part, to the association of surfactant molecules into viscosifying micelles.

The aqueous liquid used in the VES gel may be from any suitable source. By way of example, the water may be sourced from fresh water, salt water (e.g. water containing one or more salts dissolved therein), brine (e.g., saturated salt water), seawater, or any combination thereof. Salt water generally may include one or more dissolved salts therein and may be saturated or unsaturated as desired for a particular application. Seawater or brines may be suitable for use in some examples. The water may be present in any suitable amount. In a non-limiting example, the water may be present in an amount of about 30 wt. % to about 99 wt. % based on a total weight of the VES gel, or about 45 wt. % to about 98 wt. % based on a total weight of the VES gel, or about 70 wt. % to about 98 wt. % based on a total weight of the VES gel. Specific amounts of the water that may be used include, but are not limited to, 30 wt. %, 40 wt. %, 50 wt. %, 60 wt. %, 70 wt. %, 80 wt. %, 90 wt. %, 92 wt. %, 94 wt. %, 95 wt. %, 98 wt. %, or 99 wt. % based on a total weight of the VES gel. One of ordinary skill in the art with the benefit of this disclosure should recognize the appropriate amount of the aqueous liquid for a chosen application. In addition to an aqueous liquid the VES gel may include a solvent solution, such as a solvent solution that includes ethanol and/or ethylene glycol, ranging from about 5 wt. % to about 15 wt. % based on a total weight of the VES gel.

The viscoelastic surfactants included in the VES gels may include any suitable surfactant that is capable of imparting viscoelastic properties to the aqueous liquid. These viscoelastic surfactants may be zwitterionic, cationic, anionic, or amphoteric in nature, and include any number of different compounds, including, but not limited to, methyl ester sulfonates, betaines, modified betaines, sulfosuccinates, taurates, amine oxides, ethoxylated fatty amines, quaternary ammonium compounds, and combinations thereof. Suitable viscoelastic surfactants may include mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water: mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof.

The viscoelastic surfactant may be present in the VES gel in an any suitable amount to provide the desired properties (e.g., viscosity), including, but not limited to, an amount in a point ranging from about 0.1 wt. % to about 20 wt. %, or about 1 wt. % to about 10% wt. %, or about 2 wt. % to about 8 wt. %, or about 3 wt. % to about 6 wt. % based on the total weight of the VES gel. Specific amounts of the viscoelastic surfactant that may be used include, but are not limited to, about 0.1 wt. %, about 1 wt. %, about 2 wt. %, about 4 wt. %, about 6 wt. %, about 8 wt. %, about 10 wt. %, about 12 wt. %, about 14 wt. %, about 16 wt. %, about 18 wt. %, or about 20 wt. % based on a total weight of the VES gel.

As previously described, one or more dissolved salts may be present in the aqueous liquid. The amount and concentration of the dissolved salt may contribute to the formation of the viscosifying micelles by the viscoelastic surfactant. The salt may also be used to increase the density of the VES gel. Suitable dissolved salts may include monovalent, divalent salts, or trivalent salts. Mixtures of monovalent, divalent, and trivalent salts may also be used. Suitable salts may include, but are not limited to, sodium chloride, sodium bromide, potassium bromide, potassium chloride, potassium formate, cesium formate, lithium chloride, lithium bromide sodium formate, lithium formate, ammonium chloride, organic cation salts such as tetramethyl ammonium chloride, choline chloride, calcium chloride, calcium bromide, zinc bromide, and mixtures thereof among others. The salt may be provided in any amount or concentration such as unsaturated, saturated, supersaturated, and saturated with additional solids. For example, the salt may be provided in an amount of about 1 wt. % to about 85 wt. % based on a total weight of the aqueous liquid. Alternatively, the salt may be provided in an amount of about 5% to about 10% wt. %, about 10% to about 15% wt. %, about 15% to about 20% wt. %, about 20% to about 25% wt. %, about 25% to about 30% wt. %, about 30% to about 35% wt. %, about 35% to about 40% wt. %, about 40% to about 45% wt. %, about 45% to about 50% wt. %, about 50% to about 55% wt. %, about 55% to about 60% wt. %, about 60% to about 65% wt. %, about 65% to about 70% wt. %, about 70% to about 75% wt. %, about 75% to about 80% wt. %, about 80% to about 85% wt. % or about 59 wt. % or greater. Specific amounts of the salt that may be used include, but are not limited to, about 1 wt. %, about 5 wt. %, about 10 wt. %, about 20 wt. %, about 30 wt. %, about 40 wt. %, about 50 wt. %, about 60 wt. %, about 70 wt. %, about 80 wt. %, or about 85 wt. % based on a total weight of the aqueous liquid.

The VES gel may include any suitable density reducing additive. Density-reducing additives may be included in the VES gel to reduce the density as may be desired for a particular application. Suitable density reducing additives may include, but are not limited to, hollow glass spheres. Density reducing additives may be present in any suitable amount, including an amount of about 5 wt. % to about 40 wt. %, or about 10 wt. % to about 15 wt. % based on a total weight of the VES gel.

The VES gel may include any suitable pH-adjusting agent. The pH-adjusting agent may include an acidic material for lowering the pH of the VES gel, or a basic material capable of raising the pH of the VES gel. Suitable acidic pH-adjusting agents for use in the present invention include at least one selected from the group consisting of hydrochloric acid, hydrofluoric acid, hydrobromic acid, sulfuric acid, phosphoric acid, nitric acid, acetic acid, formic acid, and citric acid, derivatives thereof, and/or combinations thereof. Suitable basic pH-adjusting agents include at least one selected from the group consisting of: triethanolamine, lime, sodium hydroxide, ammonium hydroxide, potassium hydroxide, magnesium hydroxide, and a metal alkali salt, derivatives thereof, and/or combinations thereof. The pH-adjusting agent may be present in any suitable amount. A suitable amount of the pH-adjusting agent may be present in an amount including, but not limited to, about 0.1 wt. % to about 10 wt. % or about 1% wt. % to about 5 wt. % based on a total weight of the VES gel.

In certain embodiments, the VES gels used in the methods and systems of the present disclosure optionally may include any number of additional additives. Examples of such additional additives include, but are not limited to, corrosion inhibitors, oxygen scavengers, hydrogen sulfide scavengers, carbon dioxide scavengers, and scale inhibitors. A person skilled in the art, with the benefit of this disclosure, will recognize the types of additives that may be included in the fluids of the present disclosure for a particular application.

The VES gel may exhibit a number of properties that may be beneficial during perforations operations, including, but not limited to, plugging, self-breaking, and self-healing. When used, the VES gel may leak off into formation by way of perforation channels formed during the perforation operation. The VES gel may form a plug that blocks the perforation channels formed in the subterranean. As a result, fluid loss from the wellbore may be reduced during perforation operations. For example, the VES gel may substantially reduce fluid flow from the wellbore into the formation through the perforation channels. Flow through the perforation channels may considered substantially reduced when flow through the perforation channels is reduced by about 95 vol. % or more, as compared to flow of the aqueous liquid without the viscoelastic surfactant, including, but not limited, a reduction of the flow of about 95 vol. %, about 96 vol. %, about 97 vol. %, about 98 vol. %, about 99 vol. % or more. It may be advantageous to use VES gel over other fluids because the VES gel does not require pretreatment of the subterranean formation.

In addition, the plug formed in the perforation channels by the VES gel may be self-breaking. As the VES gel may have the capability of breaking when contacted by reservoir fluids (e.g., hydrocarbons, such as oil), workover or cleanup operations may be reduced and potentially eliminated. Rather, the VES gel may remain in the perforation channels preventing undesirable fluid loss into the subterranean formation until the well be placed into production. At that time, the VES gel may be contacted by reservoir fluids causing the VES gel to break, for example, due to disruption of the micelles formed by the VES surfactants. This property may be quantified measuring the viscosity of VES gel samples at different shear rates contaminated with different concentrations of hydrocarbons, such as heavy oil, light oil, or paraffins.

Another property that may be exhibit by the VES gel may be self-healing. The self-healing property of the VES gel may be observed as the VES gel may reform a continuous three-dimensional structure after it may have been broken due to high shear forces. This may beneficial, for example, during perforation operations, as the VES gel in the perforation path may be broken due to high shear, but may reform after the shear has dissipated such the three-dimensional structure from the VES surfactants may be reformed, thus reducing loss of fluid into the subterranean formation through the perforation channels. For example, after shearing and disruption by perforating, the VES gel in the perforation path may recover at least 90% or more of its viscosity in 1 minute or less, including, but not limited to, recovery of at least 95%, 99% or more of its viscosity in 1 minute, 40 seconds, 20 seconds, 10 seconds, 5 seconds, 2 seconds, or less. In addition, after shearing and disruption by perforating, the VES gel in the perforation path may recover at least 90% of its loss modulus and storage modulus in 1 minutes or less, including, but not limited to, recovery of at least 95%, 99% or more of its loss modulus and storage modulus in 1 minute, 40 seconds, 20 seconds, 10 seconds, 5 seconds, 2 seconds, or less. The self-healing property of VES gels may be quantified using a shear recovery test and a gel recovery test, where the recovery of viscosity and gel properties (G", G") are measured after fast shear changes. The shear recovery and gel recovery tests may be performed using any suitable rheometer, including an R-3 rheometer from TA Instruments having a coaxial geometry (989842). In the shear recovery test, the following steps may be performed: 1) shearing at constant shear rate of 0.1 s−1 for 120 seconds; 2) application of constant shear rate of 100.0 s−1 for 120 seconds; and 3) decrease shear rate to 0.1 s−1, in which remained for 240 seconds, in order to evaluate the time required for the system to recover its viscosity. In the gel recovery tests, the following steps may be performed: 1) evaluation in oscillatory mode with constant frequency of 1.0 Hz and stress amplitude of 1.0 Pa for 300 seconds; 2) application of a constant shear rate of 100.0 s−1 for 120 seconds; and 3) evaluation in oscillatory mode under the same initial conditions in order to evaluate the time required for the system to recover its gel characteristics.

In addition, the VES gel may be substantially solids free. The VES gel is considered substantially solids free where it has a solids content of no more than 20 mg/L. The VES gel may have a solids content of no more than 20 mg/L, 10 mg/L, 5 mg/L or even less. The aqueous liquid included in the VES gel may be filtered to provide this level of solids content. The VES gel may also be free or substantially free of polymers (other than the VES surfactant), for example, having no more 1 wt. %, 0.5 wt. %, 0.1 wt. %, 0.01 wt. %, or even less based on the total weight of the VES gel. The VES gel is considered substantially free of polymers (other than the VES surfactant) where it has a polymer content of no more than 1 wt. % based on the total weight of the VES gel. By being substantially solids free and/or substantially free of polymers, workover or remedial operations may be further reduced or even eliminated.

As previously described, the VES gel may be used in perforating operations. By way of example, the VES gel may be used as the perforating fluid or the VES gel may be used as a fluid loss control pill. When used as the perforating fluid, the VES gel may be placed over the interval of the wellbore to be perforated. The VES gel may be weighted or unweighted. The VES gel may be in the perforation path. For example, the VES gel may be disposed between a perforating gun and the casing or wellbore wall. Due its self-healing properties, the VES gel may reform after firing the perforating gun to create the perforation channels. The VES gel may form a plug in perforation channels formed by the perforating gun such that fluid loss from the wellbore may be reduced. When used as a fluid loss control pill, the VES gel may be placed in the wellbore above the interval to be perforated. Accordingly, the VES gel may be above a perforating fluid. Suitable perforating fluids may include, but are not limited to, water, salt water, brine, gels, and or any combinations thereof. After perforations are made, the VES gel may flow down to the perforation channels, thus reducing fluid loss through the perforations. Accordingly, overbalance condition may be maintained in the wellbore without significant fluid loss, minimizing damage to the reservoir during and after the perforation operation.

Where the VES gel is used as a fluid loss pill above the perforating fluid, the perforating fluid may further include a water-wetting surfactant. After perforating, the perforating fluid may leak off into the formation through the perforation channels. The water-wetting surfactant may function to stimulate the reservoir and increase initial production by adhering to the formation rock and changing the surface wettability. The surface may be highly water wet after treatment, and the water wet rocks may flow oil better. By placing the VES gel in the wellbore above the perforating fluid, the VES gel may flow down to the perforation channels as the perforating fluid is lost into the formation, such that the VES gel forms a plug in the perforation channels reducing or even eliminating fluid loss through the perforation channels.

Figure 1:
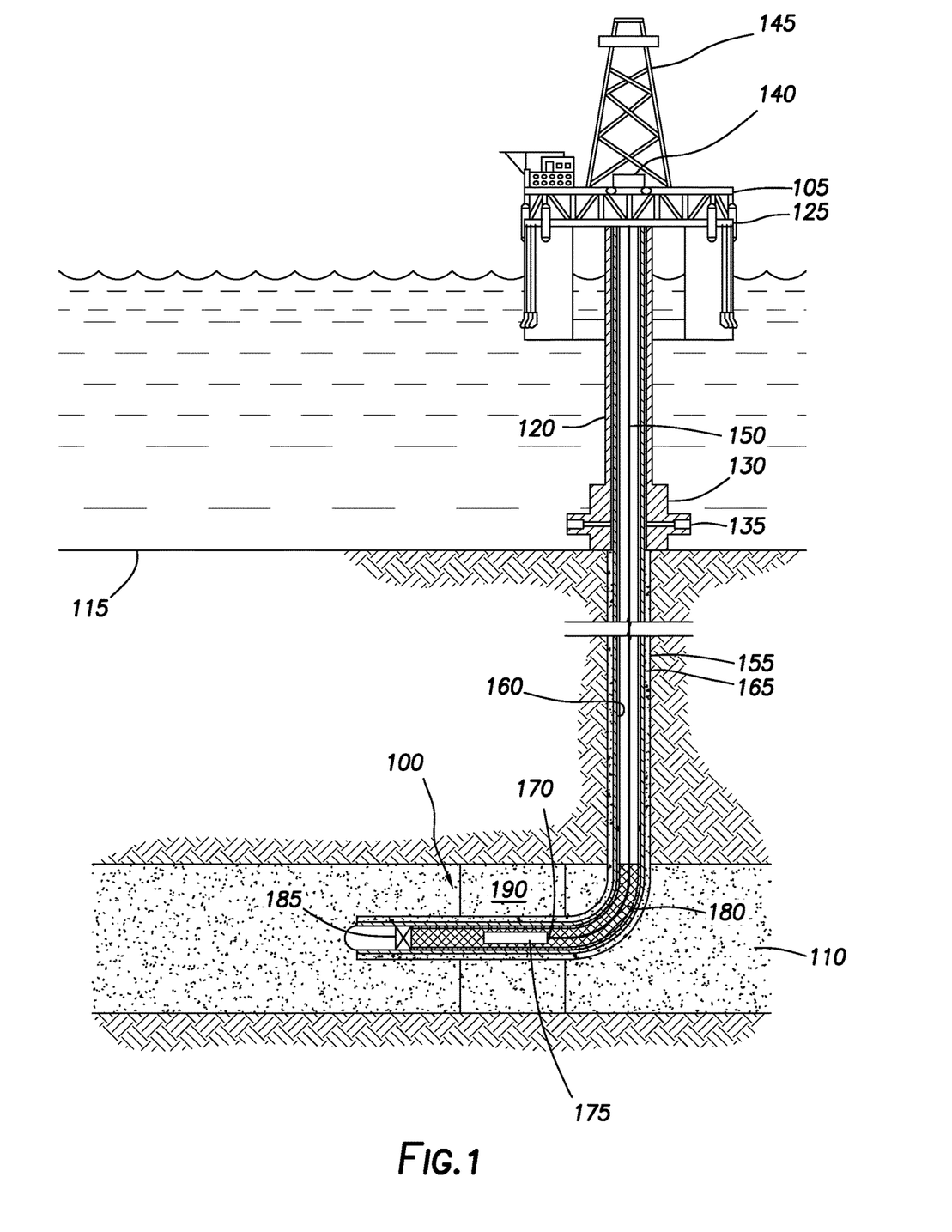
FIG. 1 illustrates an example of a downhole perforating system that uses a viscoelastic surfactant gel as a perforating fluid.

FIG. 1 illustrates an example of a downhole perforating system 100 operating from a platform 105. Platform 105 may be centered over a subterranean formation 110 located below the surface 115. A conduit 120 may extend from deck 125 of platform 105 to wellhead installation 130, which may include blow-out preventers 135. Platform 105 may have a hoisting apparatus 140 and a derrick 145 for raising and lowering pipe strings, such as, for example, work string 150 which may include the downhole perforating system 100. As illustrated, the downhole perforating system 100 may be disposed on a distal end 170 of work string 150. It should be noted that while FIG. 1 generally depicts a subsea operation, those skilled in the art will readily recognize that the principles described herein are equally applicable to land-based systems, without departing from the scope of the disclosure.

Wellbore 155 may extend through the various earth strata, including subterranean formation 110. While downhole perforating system 100 is shown disposed in a horizontal section of wellbore 155, wellbore 155 may include horizontal, vertical, slanted, curved, and other types of wellbore geometries and orientations in which downhole perforating system 100 may be disposed, as will be appreciated by those of ordinary skill in the art. A casing 160 may be cemented within wellbore 155 by cement 165. When it is desired to perforate subterranean formation 110, downhole perforating system 100 may be lowered through casing 160 until downhole perforating system 100 is properly positioned relative to subterranean formation 110. As illustrated, downhole perforating system 100 may include perforating gun 175 that may be posited in wellbore 155 relative to subterranean formation 110. Perforating gun 175 may be attached to and lowered via work string 150, which may include a drill string, tubing string, wireline, slick line, coil tubing or other conveyance.

As illustrated, VES gel 180 may be disposed in wellbore 155 adjacent subterranean formation 110 to be perforated. Downhole perforating system 100, including perforating gun 175, may be disposed in the VES gel 180, such that the perforating gun 175 may perforate through the VES gel 180 with VES gel 180 acting as perforating fluid. As illustrated, a plug 185 or other suitable device may be placed in wellbore 155 beneath the perforating gun 175, for example, to limit depth of the VES gel 180 in wellbore 155. The plug 185 may separate interval 190 of wellbore 155 to be perforated from the remainder of wellbore 155.

Figure 2:
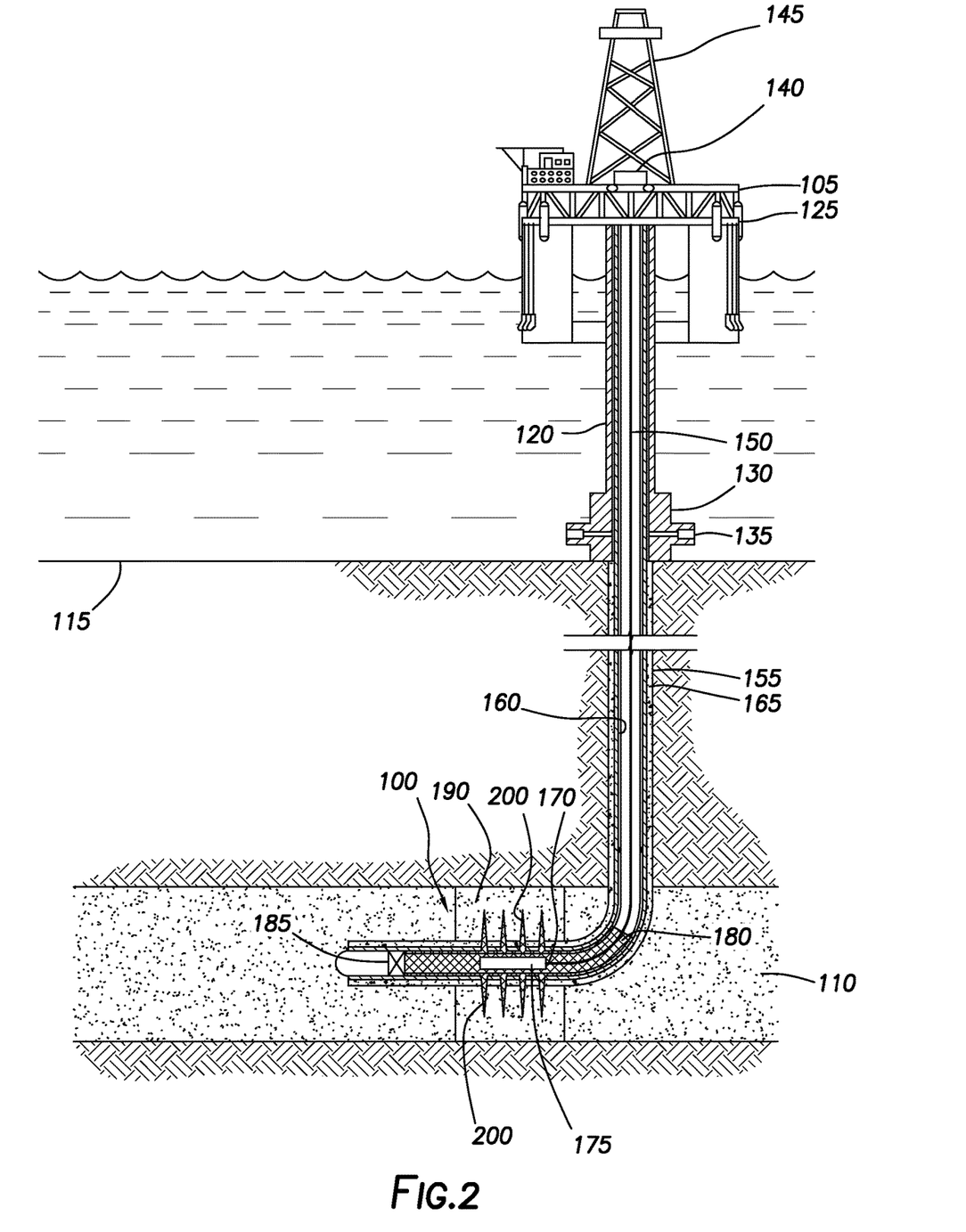
FIG. 2 illustrates an example of a downhole perforating system that uses a viscoelastic surfactant gel as a perforating fluid.

FIG. 2 illustrates an example of the VES gel 180 acting as a perforation fluid during operation of downhole perforating system 100 in wellbore 155. At a desired time, perforating gun 175 may be actuated to generate perforations 200. Perforating gun 175 may form jets that may create perforations 200. Perforations 200 may be spaced in wellbore 155 and extend outwardly through casing 160, cement 165 and into subterranean formation 110, thereby allowing formation communication between subterranean formation 110 and wellbore 155. As previously described, VES gel 180 may limit fluid loss from wellbore 155 through perforations 200. VES gel 180 may act to plug perforations 200 creating a barrier to fluid flow that may reduce fluid flow through perforations 200. When perforation gun 175 may be discharged, significant shear may be applied to VES gel 180, which may disrupt VES gel 180, resulting in a loss of viscosity, for example, due to disruptions in the physical associations of the VES surfactants. However, as previously described, VES gel 180 may be self-healing so that VES gel 180 may form a continuous three-dimensional structure formed by physical associations of VES surfactants after VES gel 180 may have been broken due to high shear forces. By reforming after the perforating gun 175 may be discharged and form a barrier preventing fluid loss through the perforations 200.

Figure 3:
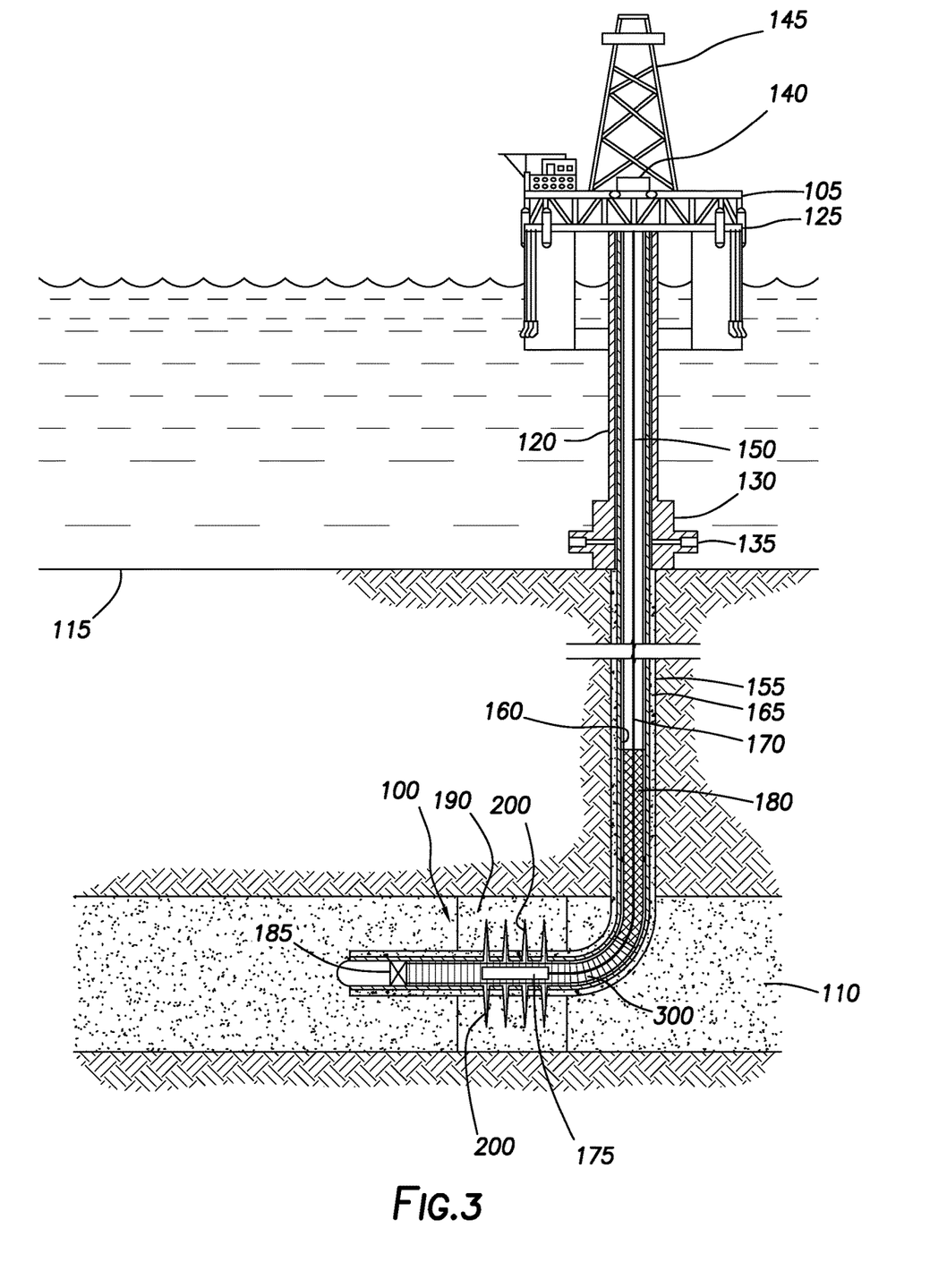
FIG. 3 illustrates an example of a downhole perforating system that uses a viscoelastic surfactant gel above an interval to be perforated.

FIG. 3 illustrates an example of VES gel 180 acting as a fluid loss control pill in downhole perforating system 100 of FIG. 1. VES gel 180 may be disposed in wellbore 155 above interval 190 to be perforated. As illustrated, perforating fluid 300 may be disposed in wellbore around perforating gun 175 such that perforating gun 175 may be discharged through perforating fluid 300. VES gel 180 may be disposed in wellbore 155 above perforating fluid 195. Any suitable perforating fluid 195 may be used. As previously described, perforating fluid 195 may include a water-wetting surfactant. After the perforating gun 175 may be discharged and forms perforations 200, the perforating fluid 300 may leak off into subterranean formation 110 through perforations 200. VES gel 180 may then enter the perforations 200, creating a plug that reduces and/or prevents fluid from wellbore 155 into subterranean formation 110.

Any suitable technique for perforating may be used as will be appreciated by those of ordinary skill in the art, with the benefit of this disclosure. For example, perforations may be formed using a perforating gun (e.g., explosive, shaped charges, etc.). The perforating may be performed in a cased or uncased interval of the wellbore.

Accordingly, this disclosure describes methods, compositions, and systems for using viscoelastic surfactant (VES) gels in well perforation. The methods, compositions, and systems may include any of the following statements:

Statement 1. A method for well treatment including: introducing a viscoelastic surfactant gel into a wellbore; and forming one or more perforation channels in an interval of the wellbore while the viscoelastic surfactant gel is disposed in the wellbore.

Statement 2. The method of statement 1, wherein a portion of the viscoelastic surfactant gel in a perforation pathway recovers at least 90% of its viscosity in 1 minute or less and recovers at least 90% of its shear modulus and loss modulus in 1 minute or less.

Statement 3. The method of statements 1 or 2, wherein a portion of the viscoelastic surfactant gel in a perforation pathway recovers at least 95% of its viscosity in 5 seconds or less.

Statement 4. The method of any of the preceding statements, wherein the one or more perforation channels extend from the wellbore, through a casing, through a cement sheath, and into a surrounding formation penetrated by the wellbore.

Statement 5. The method of any of the preceding statements, wherein the perforation channels are created while the viscoelastic surfactant gel is disposed in the interval, and wherein the forming one or more perforation channels includes firing a perforating gun through the viscoelastic surfactant gel to form the one or more perforation channels.

Statement 6. The method of any of the preceding statements, wherein the viscoelastic surfactant gel is at least substantially solids free, and wherein the viscoelastic surfactant gel is at least substantially polymer free.

Statement 7. The method of any of the preceding statements, wherein the viscoelastic surfactant gel includes an aqueous liquid, a dissolved salt, and a viscoelastic surfactant.

Statement 8. The method of any of the preceding statements, wherein the viscoelastic surfactant includes at least one surfactant selected from the group consisting of a methyl ester sulfonate, a betaine, a modified betaine, a sulfosuccinate, a taurate, an amine oxide, an ethoxylated fatty amine, a quaternary ammonium compound, and combinations thereof.

Statement 9. The method of any of the preceding statements, wherein the viscoelastic surfactant gel forms plugs that blocks the perforation channels to reduce fluid loss from the wellbore through the perforation channels.

Statement 10. The method of any of the preceding statements, wherein flow through the perforation channels is reduced by at least about 95 vol. %, as compared to flow of an aqueous liquid through the perforation channels that does not contain the viscoelastic surfactant.

Statement 11. The method of any of the preceding statements, wherein the plugs formed by the viscoelastic surfactant gel are removable by contact with a formation fluid.

Statement 12. The method of any of the preceding statements, wherein the viscoelastic surfactant gel is disposed above the interval while a perforating fluid is disposed in the interval while the perforation channels are formed.

Statement 13. The method of any of the preceding statements, further including allowing at least a portion of the perforating fluid to leak off into a subterranean formation through the one or more perforation channels such that the viscoelastic surfactant gel flows down the wellbore to plug the one or more perforation channels.

Statement 14. The method of any of the preceding statements, wherein the perforating fluid includes a water-wetting surfactant.

Statement 15. A method for well treatment including: introducing a viscoelastic surfactant gel into a wellbore over an interval of the wellbore to be perforated; disposing a perforating gun into the wellbore such that the viscoelastic surfactant gel is disposed between the perforating gun and a casing of the wellbore; and forming one or more perforation channels in the interval of the wellbore, wherein the one or more perforation channels extend through the casing and into a subterranean formation penetrated by the wellbore.

Statement 16. The method of statement 15, wherein the forming one or more perforation channels includes firing the perforating gun through the viscoelastic surfactant gel to form the one or more perforation channels.

Statement 17. The method of statements 15 or 16, wherein the viscoelastic surfactant gel has a total solids content of 5 milligrams or less per liter of the viscoelastic surfactant gel, wherein the viscoelastic surfactant gel includes an aqueous liquid, a dissolved salt, and a viscoelastic surfactant, wherein the viscoelastic surfactant gel forms plugs that blocks the perforation channels to reduce fluid loss from the wellbore through the perforation channels, wherein the plugs formed by the viscoelastic surfactant gel are removable by contact with a formation fluid, wherein a portion of the viscoelastic surfactant gel in a perforation pathway recovers at least 90% of its viscosity in 1 minute or less and recovers at least 90% of its shear modulus and loss modulus in 1 minute or less.

Statement 18. A downhole perforating system including: a perforating gun disposed at a distal end of a work string; and a viscoelastic surfactant gel.

Statement 19. The downhole perforating system of statement 18, wherein the viscoelastic surfactant gel is disposed in a wellbore while the perforating gun is disposed in the wellbore.

Statement 20. The downhole perforating system of statements 18 or 19, wherein the viscoelastic surfactant gel includes an aqueous liquid, a dissolved salt, and a viscoelastic surfactant.

To facilitate a better understanding of the present claims, the following examples of certain aspects of the disclosure are given. In no way should the following examples be read to limit, or define, the entire scope of the claims.

Example

Shear recovery and gel recovery tests were performed to evaluate the characteristics of a sample VES gel. The sample VES gels were prepared according to the following methodology: In a beaker containing 10 ml of distilled water, the needed amount of VES surfactant was added under constant stirring. Then, the volume of distilled water was slowly completed to 50 ml mixture and kept under stirring for at least 30 min to provide a VES gel with either 6 wt. % or 10 wt. % of VES surfactant. Shear recovery and gel recovery tests were then performed at 70° C. and 80° C. using a R-3 rheometer (TA) with a coaxial cylinder geometry (989842). The shear and gel recovery tests were performed using the same instrument. The shear recovery tests were performed with sample VES gels containing 6.0 wt. % and 10.0 wt. % of VES surfactant The VES surfactant used was an amine based fatty amphoteric.

In the shear recovery test, the sample VES gels were sheared at a constant shear rate of 0.1 s−1 for 120 seconds. Then, it was submitted to a constant shear rate of 100 s−1 for 120 seconds. Finally, the shear rate was decreased again to 0.1 s−1, in which remained for 240 seconds, in order to evaluate the time required for the system to recover its viscosity. In these experiments, the sample VES gels containing 6 wt. % and 10 wt. % of VES surfactant were evaluated at 70° C. and 80° C. It was observed that the sample VES gels recovered their viscosity quickly. The sample VES gel with 6 wt. % recovered its viscosity in less than one minute: in 40 seconds at 70° C. and in 20 seconds at 80° C. The sample VES gel containing 10 wt. % VES surfactant behaved similarly. The sample VES gel with 10 wt. % recovered its viscosity in less than one minute: in 80 seconds at 70° C. and almost instantaneously (80 seconds) at 80° C.

In the gel recovery test, the samples VES gels were evaluated in oscillatory mode with constant frequency of 1 Hz and stress amplitude of 1 Pa for 300 seconds. Then, the sample VES gels were submitted to a constant shear rate of 100 s−1 for 120 seconds. Finally, the sample VES gels were submitted again to oscillation under the same initial conditions, during 300 seconds, in order to evaluate the time required for the system to recover its gel characteristics. Similar trends to viscosity was observed for the gel recovery tests with gel behavior also having a quick recovery time with stabilization of the gel oscillatory profile in less than one minute, except for 10 wt. % at 70° C., indicated by recovery of the storage modulus and loss modulus in less than one minute.

In addition to shear recovery and gel recovery tests, the steady shear rheology profiles of an aqueous sample containing a VES surfactant at 6.0 wt. % were obtained at 70° C., 80° C., 85° C., and 90° C. using a R-3 rheometer (TA) with a coaxial cylinder geometry (989842) and a solvent trap, in order to prevent water evaporation. The rheology profile is provided below:

TABLE 1

| Shear Rate s−1 | Viscosity Pa · s | Shear Rate s−1 | Viscosity Pa · s | Shear Rate s−1 | Viscosity Pa · s | Shear Rate s−1 | Viscosity Pa · s |
|---|---|---|---|---|---|---|---|
| 70° C. | | 80° C. | | 85° C. | | 90° C. | |
| 0.005 | 202.395 | 0.005 | 22.8373 | 0.005 | 17.8049 | 0.005 | 7.94406 |
| 0.00792 | 187.003 | 0.00792 | 21.9141 | 0.00793 | 18.6114 | 0.00792 | 7.97207 |
| 0.01256 | 175.239 | 0.01256 | 21.039 | 0.01256 | 19.4201 | 0.01256 | 8.49714 |
| 0.01991 | 163.755 | 0.01991 | 20.5658 | 0.0199 | 20.246 | 0.01991 | 9.98855 |
| 0.03155 | 149.882 | 0.03155 | 20.1641 | 0.03155 | 21.0776 | 0.03155 | 11.1787 |
| 0.05 | 129.893 | 0.05 | 19.7266 | 0.05 | 21.3407 | 0.05 | 11.9371 |
| 0.07925 | 85.6434 | 0.07924 | 19.084 | 0.07924 | 18.9186 | 0.07924 | 11.2922 |
| 0.12559 | 48.7197 | 0.1256 | 17.5001 | 0.1256 | 16.5377 | 0.12559 | 8.78616 |

TABLE 1-continued

| Shear Rate s-1 | Viscosity Pa · s | Shear Rate s-1 | Viscosity Pa · s | Shear Rate s-1 | Viscosity Pa · s | Shear Rate s-1 | Viscosity Pa · s |
|---|---|---|---|---|---|---|---|
| 70° C. | | 80° C. | | 85° C. | | 90° C. | |
| 0.19905 | 32.1514 | 0.19905 | 15.6684 | 0.19905 | 15.386 | 0.19905 | 8.26906 |
| 0.31548 | 21.5893 | 0.31548 | 13.9613 | 0.31548 | 14.1494 | 0.31548 | 7.83302 |
| 0.5 | 14.6677 | 0.5 | 11.975 | 0.5 | 12.5829 | 0.5 | 6.85861 |
| 0.79244 | 10.0614 | 0.79245 | 9.09599 | 0.79245 | 10.4028 | 0.79245 | 6.08265 |
| 1.25595 | 6.79134 | 1.25594 | 5.92166 | 1.25594 | 7.54891 | 1.25595 | 5.16037 |
| 1.99054 | 4.52364 | 1.99053 | 4.06553 | 1.99053 | 4.90682 | 1.99054 | 4.0145 |
| 3.1548 | 2.8901 | 3.15479 | 2.70976 | 3.15479 | 3.24365 | 3.15479 | 2.74101 |
| 5.00001 | 1.75729 | 4.99999 | 1.77411 | 5 | 2.09755 | 4.99999 | 1.86266 |
| 7.92447 | 1.09482 | 7.92447 | 1.17129 | 7.92447 | 1.34861 | 7.92447 | 1.25421 |
| 12.5594 | 0.69448 | 12.5594 | 0.76441 | 12.5594 | 0.85844 | 12.5594 | 0.82901 |
| 19.9054 | 0.44559 | 19.9054 | 0.49247 | 19.9054 | 0.54968 | 19.9053 | 0.54703 |
| 31.5478 | 0.28893 | 31.5479 | 0.31603 | 31.5479 | 0.35476 | 31.5479 | 0.35794 |
| 49.9999 | 0.17816 | 50.0001 | 0.20418 | 50 | 0.23119 | 50 | 0.2365 |
| 79.2447 | 0.11606 | 79.2447 | 0.13231 | 79.2448 | 0.15271 | 79.2446 | 0.15639 |
| 125.594 | 0.08647 | 125.594 | 0.08772 | 125.594 | 0.0999 | 125.594 | 0.10441 |
| 199.057 | 0.06675 | 199.054 | 0.05868 | 199.054 | 0.06693 | 199.053 | 0.07055 |
| 315.48 | 0.05158 | 315.479 | 0.0401 | 315.479 | 0.04589 | 315.478 | 0.04894 |
| 499.997 | 0.03911 | 500.001 | 0.02801 | 499.999 | 0.03235 | 499.997 | 0.03492 |
| 792.443 | 0.03081 | 792.448 | 0.02078 | 792.444 | 0.02357 | 792.444 | 0.0265 |
| 999.998 | 0.02692 | 999.995 | 0.01878 | 999.997 | 0.02199 | 999.998 | 0.02368 |

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A downhole perforating system comprising:
a perforating gun disposed at a distal end of a work string, wherein the perforating gun is submerged in a perforating fluid comprising a water wetting surfactant, wherein the perforating fluid is capable of leaking off into a formation through one or more perforation channels; and
a viscoelastic surfactant gel disposed above the perforating fluid.

2. The downhole perforating system of claim 1, wherein the viscoelastic surfactant gel is disposed in a wellbore while the perforating gun is disposed in the wellbore.

3. The downhole perforating system of claim 1, wherein the viscoelastic surfactant gel comprises an aqueous liquid, a dissolved salt, and a viscoelastic surfactant.

4. A method for well treatment comprising:
introducing a viscoelastic surfactant gel and a perforating fluid into a wellbore such that the perforating fluid is placed in a casing interval to be perforated and the viscoelastic surfactant gel is placed above the casing interval to be perforated, wherein the perforating fluid comprises a water wetting surfactant;
forming one or more perforation channels in the casing interval to be perforated while the viscoelastic surfactant gel is disposed in the wellbore;
allowing the perforating fluid to leak off into the formation through the one or more perforation channels; and allowing the viscoelastic surfactant gel to form a plug in the one or more perforation channels.

5. The method of claim 4, wherein a portion of the viscoelastic surfactant gel in a perforation pathway recovers at least 90% of its viscosity in 1 minute or less and recovers at least 90% of its shear modulus and loss modulus in 1 minute or less.

6. The method of claim 4, wherein a portion of the viscoelastic surfactant gel in a perforation pathway recovers at least 95% of its viscosity in 5 seconds or less.

7. The method of claim 4, wherein the one or more perforation channels extend from the wellbore, through a casing, through a cement sheath, and into a surrounding formation penetrated by the wellbore.

8. The method of claim 4, wherein a portion of the viscoelastic surfactant gel is disposed in the interval to be perforated, and wherein the perforation channels are created while the portion of the viscoelastic surfactant gel is disposed in the interval, and wherein the forming one or more perforation channels comprises firing a perforating gun through the portion of the viscoelastic surfactant gel to form the one or more perforation channels.

9. The method of claim 4, wherein the viscoelastic surfactant gel is at least substantially solids free, and wherein the viscoelastic surfactant gel is at least substantially polymer free.

10. The method of claim 4, wherein the viscoelastic surfactant gel comprises an aqueous liquid, a dissolved salt, and a viscoelastic surfactant.

11. The method of claim 4, wherein the viscoelastic surfactant comprises at least one surfactant selected from the group consisting of a methyl ester sulfonate, a betaine, a modified betaine, a sulfosuccinate, a taurate, an amine oxide, an ethoxylated fatty amine, a quaternary ammonium compound, and combinations thereof.

12. The method of claim 4, wherein the plugs formed from the viscoelastic surfactant gel blocks the perforation channels to reduce or eliminate fluid loss from the wellbore through the perforation channels.

13. The method of claim 12, wherein flow through the perforation channels is reduced by at least about 95 vol. %, as compared to flow of an aqueous liquid through the perforation channels that does not contain the viscoelastic surfactant.

14. The method of claim 12, wherein the plugs formed by the viscoelastic surfactant gel are removable by contact with a formation fluid.

15. A method for well treatment comprising:

introducing a viscoelastic surfactant gel and a perforating fluid into a wellbore over an interval of the wellbore to be perforated such that the perforating fluid is placed in the casing interval to be perforated and the viscoelastic surfactant gel is placed above the casing interval to be perforated, wherein the viscoelastic surfactant gel comprises a viscoelastic surfactant and a water wetting surfactant;

disposing a perforating gun into the wellbore such that the perforating fluid is disposed between the perforating gun and a casing of the wellbore;

forming one or more perforation channels in the interval of the wellbore, wherein the one or more perforation channels extend through the casing and into a subterranean formation penetrated by the wellbore; and allowing the perforating fluid to leak off into the formation through the one or more perforation channels.

16. The method of claim 15, wherein the forming one or more perforation channels comprises firing the perforating gun through the perforating fluid to form the one or more perforation channels and further flowing the viscoelastic surfactant gel into the one or more perforation channels to form a plug in the one or more perforation channels.

17. The method of claim 15, wherein the viscoelastic surfactant gel has a total solids content of 5 milligrams or less per liter of the viscoelastic surfactant gel, wherein the viscoelastic surfactant gel comprises an aqueous liquid, a dissolved salt, and a viscoelastic surfactant, wherein the viscoelastic surfactant gel forms plugs that blocks the perforation channels to reduce fluid loss from the wellbore through the perforation channels, wherein the plugs formed by the viscoelastic surfactant gel are removable by contact with a formation fluid, wherein a portion of the viscoelastic surfactant gel in a perforation pathway recovers at least 90% of its viscosity in 1 minute or less and recovers at least 90% of its shear modulus and loss modulus in 1 minute or less.

* * * * *

UNITED STATES PATENT AND TRADEMARK OFFICE
CERTIFICATE OF CORRECTION

Page 1 of 1

PATENT NO. : 10,947,443 B2
APPLICATION NO. : 16/482568
DATED : March 16, 2021
INVENTOR(S) : Jose Luis Carvalho Mota and William Walter Shumway It is certified that error appears in the above-identified patent and that said Letters Patent is hereby corrected as shown below:

In the Claims

Column 13 Line 36, Claim 12 from "plugs" to --plug--.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*